United States Patent [19]
Roose

[11] Patent Number: 4,457,360
[45] Date of Patent: Jul. 3, 1984

[54] MULTI-LEAD HEAT SINK

[75] Inventor: Lars D. Roose, Albuquerque, N. Mex.

[73] Assignee: The Regents of the University of California, Berkeley, Calif.

[21] Appl. No.: 411,393

[22] Filed: Aug. 25, 1982

[51] Int. Cl.³ .............................................. B23K 3/00
[52] U.S. Cl. ................................. 165/80 B; 24/458; 24/567; 228/46; 269/287; 269/254 CS
[58] Field of Search ................. 165/80 B, 80 D, 185; 174/16 HS, 35 TS; 361/386; 357/81; D13/23; 228/46; 269/254 CS, 287, 254 R; 24/259 R, 259 RC, 256

[56] References Cited

U.S. PATENT DOCUMENTS

| | | | |
|---|---|---|---|
| D. 262,960 | 2/1982 | Johnson et al. | D13/23 |
| 1,797,836 | 3/1931 | Paul | 269/254 CS |
| 2,496,109 | 1/1950 | Terry | 269/254 R |
| 2,673,721 | 3/1954 | Dickinson | 165/80 B |
| 3,193,610 | 7/1965 | Worden, Sr. | 165/80 B |
| 3,291,476 | 12/1966 | Calkin | 269/254 R |
| 3,358,751 | 12/1967 | Berwald et al. | 165/185 |
| 3,640,519 | 2/1972 | Halstead | 24/259 R |
| 3,874,443 | 4/1975 | Bayer | 165/80 B |
| 4,246,597 | 1/1981 | Cole et al. | 165/80 D |

OTHER PUBLICATIONS

IBM Technical Disclosure Bulletin, vol. 21, No. 5, Oct. 1978.

Primary Examiner—Albert W. Davis, Jr.
Attorney, Agent, or Firm—Fitch, Even, Tabin & Flannery

[57] ABSTRACT

The disclosure relates to a heat sink used to protect integrated circuits from the heat resulting from soldering them to circuit boards. A tubular housing contains a slidable member which engages somewhat inwardly extending connecting rods, each of which is rotatably attached at one end to the bottom of the housing. The other end of each rod is fastened to an expandable coil spring loop. As the member is pushed downward in the housing, its bottom edge engages and forces outward the connecting rods, thereby expanding the spring so that it will fit over an integrated circuit. After the device is in place, the member is slid upward and the spring contracts about the leads of the integrated circuit. Soldering is now conducted and the spring absorbs excess heat therefrom to protect the integrated circuit. The placement steps are repeated in reverse order to remove the heat sink for use again.

6 Claims, 4 Drawing Figures

MULTI-LEAD HEAT SINK

This invention is the result of a contract with the Department of Energy (Contract No. W-7405-ENG-36).

BACKGROUND OF THE INVENTION

The field of the invention relates to heat sinks and more particularly to a heat sink which is circumferentially expandable and contractable and which can simultaneously physically contact all the leads of an electronic device.

In the electronic industry, electronic devices such as semiconductors, operational amplifiers, and other integrated circuits frequently must be soldered into position on a printed circuit board. During such soldering care must be taken to ensure that heat from the soldering iron at the joint where the lead is soldered does not travel up the lead into the electronic device and destroy the device, lower its efficiency, or change its characteristics. Typically, heat sink clips are fastened one at a time to individual leads before they are soldered. This is a time consuming operation and inefficient from a labor cost standpoint.

An apparatus in accordance with the invention will provide a heat sink for all the leads in one operation.

SUMMARY OF THE INVENTION

In accordance with the present invention there is provided a multi-lead heat sink apparatus comprising an expandable lead encircling heat sink, structure for expanding the heat sink to allow it to be placed over an electronic device and for allowing the heat sink after it is placed over the device to contract, thereby causing all the leads of the electronic device to come into physical contact with the expandable heat sink so that the leads of the device may be safely soldered. In a preferred embodiment the heat sink is a lead encircling heat sink such as a loop of coil spring. Also in the preferred embodiment the coil spring is attached to the base of a tubular housing by a plurality of somewhat inwardly extending connecting rods and a longitudinally slidable member is positioned within the housing. When the member is pushed downward from an uppermost position against the connecting rods, it pushes them outward thereby forcing the coil spring to expand.

One object of the present invention is to decrease the time needed to solder electronic devices to printed circuit boards.

Another object of the present invention is to decrease labor time for fastening heat sinks to electronic device leads.

An advantage of the instant invention is that it is inexpensive to construct and easy to use.

Another advantage of the instant invention is that it may be used manually by technicians or may be incorporated into a robot used for automated soldering.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings.

DETAILED DESCRIPTION OF A PREFERRED EMBODIMENT OF THE INVENTION

Figure 1:
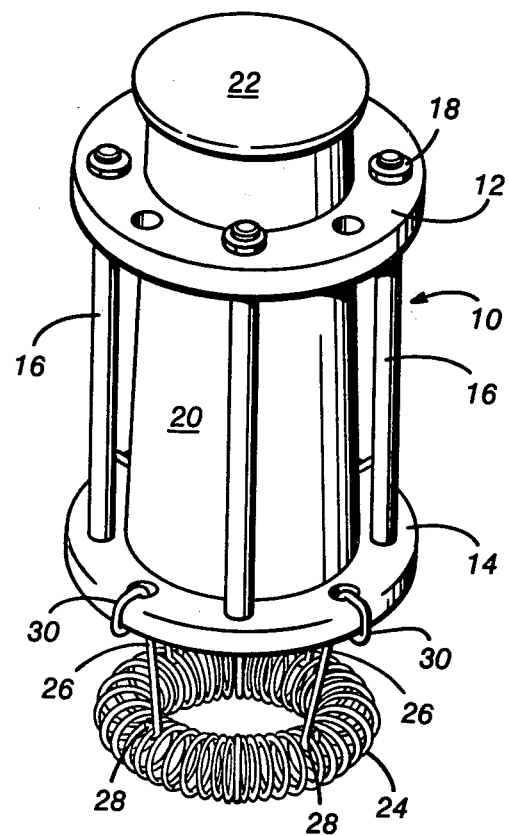
FIGS 1, 2, 3, and 4 show perspectively a preferred embodiment of the invention and the various steps of its use.

Reference is now made to FIG. 1 which shows a preferred embodiment of the invention having the heat sink thereof in its contracted position preparatory to use. As seen therein, a housing 10 which is generally tubular or cylindrical in configuration comprises an upper ring 12 and a lower ring 14. Rings 12 and 14 are spaced and parallel to one another and are positioned by support rods 16. Each rod 16 is threaded at one end into ring 14 and at its other end is threaded through upper ring 12 and secured by nuts 18. An inner member 20 is slidably positionable within housing 10. In the preferred embodiment inner member 20 is slightly tapered inwardly from a base which will not pass through lower ring 14 to an upper portion topped by a cap 22. In the preferred embodiment member 20 may comprise a length of copper tubing which has been expanded at its lower end. Member 20 need not be tubular, but may be solid. It need not be made of metal but may be made of a durable plastic or other heat resistant material. Furthermore, it need not have a cap 22, particularly if it is solid. In addition, member 20 need not be tapered but it should have some structure for stopping its upward motion at some point to keep it from falling out of the housing 10. Housing 10 need not comprise two rings connected by support rods but may be a generally cylindrical piece of tubing or other structure. Furthermore, the device is not limited to being circular in cross section but may be square or multi-sided or of any practical cross sectional shape.

The preferred embodiment illustrated is suitable to be hand-held by an individual who solders electronic devices. The structure thereof may be modified so that it can be utilized effectively by a robot.

In base ring 14 or, in the case of a tubular housing, at the base thereof, are rotatably attached connecting rods 26 which connect the base of the housing 10 to an expandable and contractable heat sink such as a coil spring 24. At their upper ends the connecting rods are inserted through suitable apertures in base ring 14. The upper ends of rods 26 are formed into loops 30 so that the connecting rods are effectively rotatively attached to the base 14. They are fastened so that the connecting rods may rotate outwardly as the heat sink 24 expands and inwardly as it contracts. The lower end of each connecting rod 26 is formed into a small loop 28 and is affixed to a coil of spring 24. Each loop 28 can be fastened securely to spring 24 or it can be somewhat loose.

Figure 2:
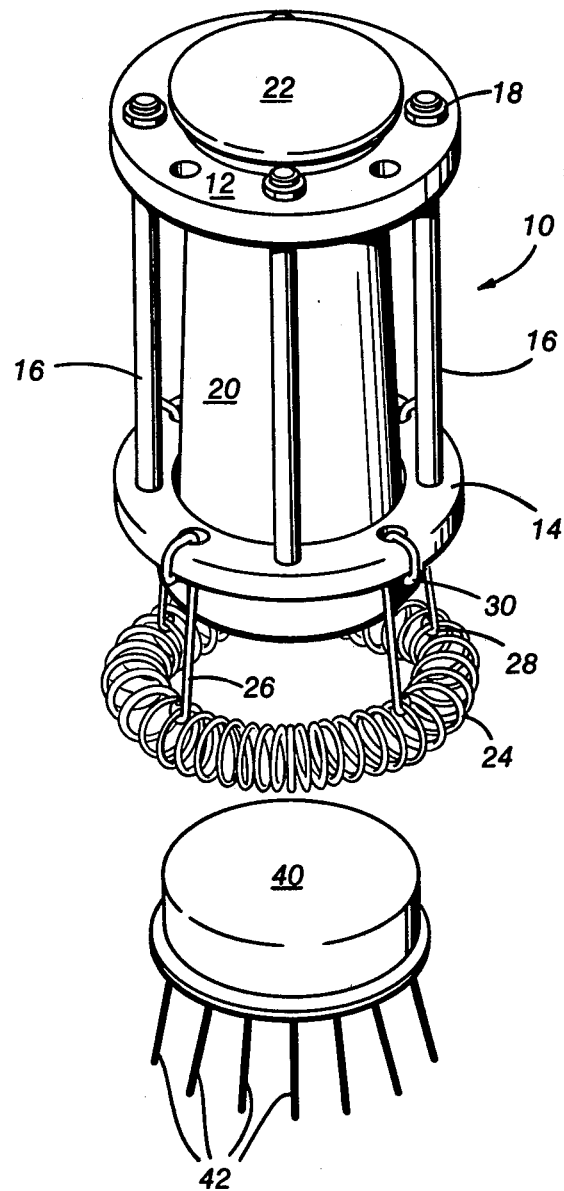
Figure 3:
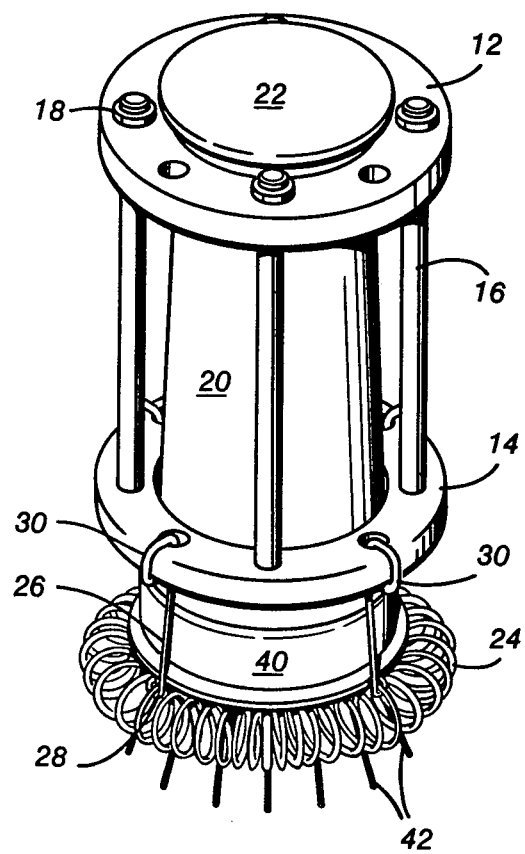
Figure 4:
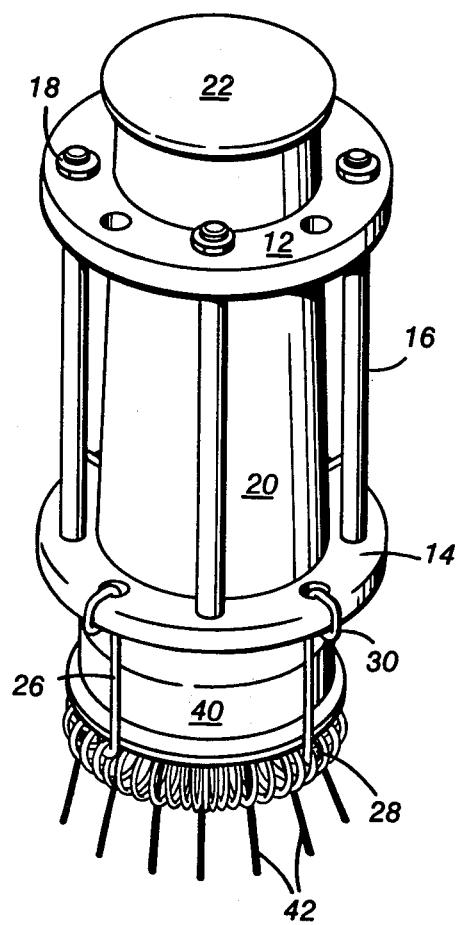

FIG. 2 shows, disposed below the preferred embodiment in its expanded position, an electronic device 40 having a plurality of leads 42 extending therefrom. Electronic device 40 is positioned on a printed circuit board (not shown) and the leads 42 thereof are to be soldered to the printed circuit board. To provide a heat sink for soldering, a user pushes down on cap 22 which causes member 20 to slide downward relative to housing 10. The outer edge of the lower end of member 20 pushes outwardly on the somewhat inwardly extending connecting rods 26 as it slides against them. The outwardly moving rods force the coil spring 24 to expand so that it may be placed over the electronic device 40. The user then moves the expanded coil spring 24 over electronic device 40 until the coil spring is positioned about leads 42 as shown in FIG. 3. At this point the user releases his downward pressure on the cap 22 and the inherent tension of the spring 24 causes member 20 to slide upward relative to housing 10. Alternatively, the device could be designed so that a user would grasp the edges of the cap and pull to cause the member 20 to slide upward in the housing. The upward movement of the member is stopped when its lower end, which is slightly larger in diameter than the inside diameter of ring 14, abuts ring 14. This retains member 20 within housing 10. As member 20 moves upward within housing 10 its lower end recedes into the housing; the tension within coil spring 24 causes it to contract to its untensioned length or as much as it is allowed go. This contraction brings some coils of spring 24 into physical contact with all of the leads 42 of electronic device 40 as seen in FIG. 4. Since the leads of electronic device 40 are in place on the printed circuit board onto which they are to be soldered, the soldering operation can now be accomplished. The heat sink provided by the coil spring 24 will absorb sufficient excess heat from the leads during the soldering operation to protect the device 40.

After the soldering operation is completed the steps are reversed. Cap 22 is again pushed down to force coil spring 24 to expand. The coil spring 24 is then passed over and removed from electronic device 40. The heat sink apparatus is ready for use again.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multi-lead heat sink apparatus comprising;
an expandible lead encircling heat sink including a loop of coil spring having a preselected untensioned size;
means for expanding said heat sink to allow it to be placed over an electronic device; and
means for enabling said heat sink to contract to said preselected size after said heat sink is placed over said device to cause it to physically contact all of the leads thereof so that the leads of the device may be safely soldered.

2. An apparatus comprising:
expandable and contractable means for encircling and physically contacting the leads of an electronic device;
said lead encircling means comprising a loop of coiled spring;
housing means;
means for attaching said lead encircling means to said housing means; and
means extendable from said housing for expanding and contracting said lead encircling means.

3. The invention of claim 2 wherein said attaching means comprises a plurality of connecting rods, each rod being rotatably attached at one end to said housing means and at its other end fastened to said lead encircling means.

4. The invention of claim 2 wherein said housing comprises a generally tubular structure.

5. The invention of claim 4 wherein said connecting rods are somewhat inwardly extending and said extendable means comprises a longitudinal member, longitudinally slidably positionable within said tubular structure, which pushes outwardly said connecting rods when pushed down through said housing.

6. A heat sink apparatus for protecting an electronic device from heat during the soldering of its leads, said apparatus comprising;
a generally tubular housing;
an inner slightly tapered generally cylindrical member longitudinally slidably disposed within said tubular housing, the lower end of said member being just sufficiently large to fail to pass upwardly through the lower end of said tubular housing, said member being somewhat longer in length than the length of said tubular housing, the smaller upper end of said member extending somewhat above the upper end of said housing when said member is at its uppermost position in said housing and extending somewhat below the lower end of said housing when said member is at its lowermost position in said housing;
a loop of coil spring having a preselected untensioned size somewhat smaller than the lower end of said housing, said preselected size being suitable to contact all the leads of the electronic device when said spring is untensioned and positioned about said leads;
a plurality of connecting rods, each fastened at its lower end to the spring and at is upper end rotatably attached to the lower end of said housing, said rods acting to suspend said spring from said housing, said rods extending somewhat inwardly from the lower end of said housing to said spring when said member is at its upwards position and said spring is therefore untensioned, and said rods being forced outwardly by downward movement of the lower end of said member to cause said loop of spring to become sufficiently large to encircle the body of said electronic device when said member is in its lowest position.

* * * * *